United States Patent [19]

Niederdellmann et al.

[11] 4,039,516

[45] Aug. 2, 1977

[54] PROCESS FOR THE PRODUCTION OF SOLUBLE HIGH MOLECULAR WEIGHT POLYURETHANES WHICH ARE FREE FROM ISOCYANATE GROUPS

[75] Inventors: Georg Niederdellmann, Dormagen; Henning Klussmann, Rommerskirchen; Horst Conrad, Dormagen, all of Germany

[73] Assignee: Bayer Aktiengesellschaft, Leverkusen, Germany

[21] Appl. No.: 674,355

[22] Filed: Apr. 7, 1976

[30] Foreign Application Priority Data

Apr. 10, 1975 Germany .............................. 2515766

[51] Int. Cl.$^2$ .............................................. C08G 18/08
[52] U.S. Cl. ........................ 260/75 NE; 260/77.5 AA
[58] Field of Search .................... 260/75 NE, 77.5 AA

[56] References Cited

U.S. PATENT DOCUMENTS

| 3,415,790 | 12/1968 | Davis et al. ................ 260/75 NE X |
| 3,639,652 | 2/1972 | Mommaerts et al. ...... 260/75 NE X |
| 3,642,964 | 2/1972 | Rausch et al. ............... 260/75 NE X |
| 3,817,933 | 6/1974 | Niederdellmann et al. .... 260/75 NE |
| 3,915,923 | 10/1975 | Ward ...................... 260/77.5 AA X |
| 3,948,847 | 4/1976 | Aitken et al. ........... 260/77.5 AA X |

OTHER PUBLICATIONS

D.O.S. 2,149,836 (Niederdellmann et al.) Apr., 1973 pp. 1–20.

Primary Examiner—H.S. Cockeram
Attorney, Agent, or Firm—Gene Harsh; Lawrence S. Pope; Frederick H. Colen

[57] ABSTRACT

This invention relates to an improved process for the production of high molecular weight polyurethanes which are free from isocyanate groups and are soluble in organic solvent in reduced reaction times. The reactants, polyol and isocyanate, for example, are mixed together with solvent and the temperature is permitted to rise under the effect of the heat of reaction. The reaction mixture is then cooled with solvent addition in such a way that the viscosity of the reaction mixture remains constant until the optimum temperature for the polyurethane formation reaction ("specific reaction temperature") is reached. The mixture is then gradually cooled until there is no residual isocyanate present and the polymer is recovered from the reaction mixture.

9 Claims, 5 Drawing Figures

PROCESS FOR THE PRODUCTION OF SOLUBLE HIGH MOLECULAR WEIGHT POLYURETHANES WHICH ARE FREE FROM ISOCYANATE GROUPS

FIELD OF THE INVENTION

This invention relates to a process for the production of high molecular weight polyurethanes in solution, in which undesirable secondary reactions which result in branching are largely suppressed by means of a controlled particular temperature profile (the control is preferably by means of the solvent dosage).

BACKGROUND OF THE INVENTION

High molecular weight hydroxyl group-containing polyurethanes soluble in organic solvents have long been of commercial significance, especially in the production of two-component coating compositions and adhesives (cf. "Bayer-Kunststoffe", 3rd Edition 1963, pages 132 et seq and pages 422 et seq).

The production of hydroxyl polyurethanes of this type is described, for example, in German Pat. No. 962,522 and 1,012,456, and is carried out by adding a diisocyanate, for example, tolylene diisocyanate, p-phenylene diisocyanate, diphenyl methane-4,4'-diisocyanate or hexamethylene diisocyanate, at a temperature of from 80° to 90° C to linear compounds having two hydroxyl groups and a molecular weight below 5000, for example, polyesters of succinic acid, adipic acid, sebacic acid, dodecane dicarboxylic acid or phthalic acid, and ethylene glycol, polyethylene glycols, propylene glycol, polypropylene glycols, butane diol, hexane diol or neopentyl glycol, or polyethers, for example, based on ethylene oxide, propylene oxide and butylene oxide, the NCO:OH ratio being $\leqq$ 1 and preferably from 0.92 to 0.99, briefly stirring the reaction mixture in order to homogenize it and heating the thus-homogenized mixture in a reaction vessel for about 10 hours at 120° C in order to complete the reaction. The end products of this process are soluble, high molecular weight rubber-like products having an average molecular weight (weight average) of from about 30,000 to 250,000, preferably from about 50,000 to 150,000, depending upon the NCO:OH ratio.

The increasing significance of high molecular weight hydroxyl group-containing polyuretnanes soluble in organic solvents as starting components for the production of high-quality plastics, for example, for the adhesives sector, for coating textiles, for lamination purposes, for dressing leather, etc. is resulting in continuously increasing quality requirements in regard to the polyurethane components, more especially in regard to their consistency, reproducibility and the specification range of their property spectrum.

However, it has long been known that the reaction of isocyanates with compounds containing reactive hydrogen atoms carried out in the melt in the manner described above is inconsistent, difficult to control and equally difficult to reproduce (cf. German Pat. No. 962,552 and Otto Bayer: "Das Diisocyanat-Polyadditions-Verfahren" in Kunststoff-Handbuch, Vol. VII, page 20, published by Richard Vieweg and August Hochtlen, Carl-Hanser-Verlag, Munich, 1966 and Houben-Weyl, Vol. 14, part 2, pages 72 to 73). According to the above-mentioned literature references, the reproducibility of the polyurethane reaction is promoted by using inert organic solvents, more especially hydrocarbons, such as benzene, toluene, xylene, chlorobenzene and o-dichlorobenzene, the reaction of 1,4-butane diol with hexamethylene diisocyanate in chlorobenzene to form an injection-moldable polyurethane powder having an average molecular weight of up to 15,000 and melting point of 184° C being quoted as in Example.

There has also been no shortage of attempts to react high molecular weight polyols, such as polyesters or polyethers, with diisocyanates in this way. However, considerable difficulties were involved in obtaining substantially the same molecular weights as in the melt process. According to U.S. Pat. No. 2,223,672 for example, the reaction of equimolar quantities of a linear aliphatic polyester containing hydroxyl groups (molecular weight from 1500 to 3000) with an aromatic diisocyanate in boiling aromatic solvents, such as benzene, toluene or xylene, gives polyurethanes having an average weight of from 10,000 to 15,000, corresponding to a solution viscosity of from 400 to 3000 centipoises at room temperature for the solutions adjusted to a polyurethane content of from 10 to 30%, by weight, with a polar solvent, preferably methyl ethyl ketone. Although solutions of this type may be used, for example, as laminating adhesives, they are not suitable for the production of high-quality textile coatings both on account of their low molecular weight and on account of their low solution viscosity.

German Auslegescrift No. 1,301,124 describes the production of polyurethanes by reacting a mixture of (a) 1 mol of a polyester (molecular weight from 1200 to 5000) containing terminal hydroxyl groups, (b) from 2 to 4 mols of a diol containing primary hydroxyl groups and, optionally, (c) at most 0.5 mol of a triol containing primary and/or secondary hydroxyl groups, with aliphatic diisocyanates in an NCO:OH ratio of $\ominus$ 1 in the presence of chlorinated aromatic solvents with a boiling point of from 120° to 200° C which are inert to isocyanate groups, for example, chlorobenzene or o-dichlorobenzene. However, the polyurethanes obtained are insoluble in most organic solvents, such as methylene chloride, chloroform, trichloroethylene, cyclohexane, benzene, toluene, acetone, methyl ethyl ketone, ethers, dioxane, tetrahydrofuran, pyridine, dimethyl formamide and dimethyl sulphoxide, and may only be thermoplastically processed following removal of the chlorinated aromatic solvent.

The reaction of linear dihydroxyl compounds with diisocyanates in an NCO:OH ratio of $\ominus$ 1, preferably from about 0.95 to 1.0, in the absence of chain extenders to form very high molecular weight (average molecular weights up to more than 250,000) hydroxyl group-containing polyurethanes, which are soluble in most organic solvents, in the presence of solvents, was described for the first time in DOS No. 2,149,836 in the form of a three-stage process. This three-stage process is distinguished in particular by the fact that (a) in a first reaction stage the starting components are reacted at a "specific reaction temperature" adjusted to an accuracy of ± 1° C in the range of from 100° to 160° C, preferably from 115° to 140° C, in the presence of non-polar or weakly polar solvents with continuous monitoring of viscosity until a maximum viscosity is reached; (b) in a second reaction stage the reaction mixture is left to react for from 12 to 72 hours at from 60° to 100° and preferably at from 70° to 90° C until no more free isocyanate may be detected; and (c) in a third reaction stage the solvent is removed in known manner at reduced pressure and elevated temperature.

Suitable solvents are non-polar or weakly polar solvents having an $E_T$-value of less than 35 (for the definition of the $E_T$-value as a measure of solvent polarity, cf. Fortschritt chem. Forsch, vol 11/1, pages 1 to 73), for example, toluene ($E_T = 33.9$), xylene ($E_T = 33.2$) or cyclohexane ($E_T = 34.0$), di-n-butyl ether ($E_T = 33.4$), carbon disulphide ($E_T = 32.6$), carbon tetrachloride ($E_T = 32.5$), n-hexane (ligroin) $E_T = 30.9$); toluene is preferred. The reaction is carried out using from 30 to 80, preferably from 50 to 60, parts, by weight of solvent to from 70 to 20, preferably from 50 to 40, parts, by weight, of the starting components, the solvent having effectively to dissolve the starting components and to dissolve the polyaddition product formed at least to such an extent that a homogeneous phase is always present under the reaction conditions.

The "specific reaction temperature" is a parameter which has to be determined in a preliminary test for each diol-diisocyanate combination. It is generally from 115 to 140° C. In the context of the invention, the "specific reaction temperature" is that temperature at which the highest viscosity (i.e. the highest molecular weight or the lowest proportion of allophanate branchings) of the fully reacted polyurethane solution is obtained with a given NCO:OH ratio of the reaction mixture (cf. FIGS. 1 to 3). The "specific reaction temperature" may readily be determined by keeping several portions of the same reaction mixture (with the same quantities of solvent in each case) at different temperatures in the range of from 100° to 160° C until all the NCO-groups have disappeared, and subsequently determining the viscosity of the polymer solution formed at room temperature. Since the "specific reaction temperatures" are generally above the boiling point of the solvent used, the reactions are carried out in reactors designed for corresponding excess pressures.

This process, which is described in DOS No. 2,149,836, is highly reproducible in terms of large scale production and leads to chemically particularly consistent linear polyurethanes which are completely soluble in most organic solvents without any signs of gelling or swelling and which, in combination with polyisocyanates, are eminently suitable for the production of high-quality two-component testile coatings and for the production of polyurethane adhesives and leather dressings.

Unfortunately, the process described in DOS No. 2,149,836, by comparison with conventional melt polyaddition, requires a much longer reaction time, so that in some cases the improvement in the quality of the end products is prohibitively offset by the poorer volume-time yield of the production unit. In addition, the scope of application of the process is limited to an extent by the necessary solubility of the end polyurethane in the only weakly polar reaction medium. In particular, polyurethanes of the type into which additional urethane segments are incorporated by using short-chain diols having molecular weights of from about 60 to 300 in order to obtain particular properties and which are readily soluble in the most commonly used solvents, such as ethyl acetate, acetone, methyl ethyl ketone or methyl glycol acetate, show a marked thixotropic effect in the weakly polar solvents used as reaction medium, for example, in toluene. This not only makes it very difficult to assess the degree of polyaddition by continuous monitoring of the viscosity of the reaction medium, but it may also lead to interruptions in production on account of the inadequate stirrability and pumpability of the reaction solution.

SUMMARY OF THE INVENTION

It has now been found that these disadvantages may be eliminated with surprising success in accordance with the present invention by carrying out the polyaddition reaction in only a single stage, rather than in the two above-described reaction stages (a) and (b) each carried out at a constant temperature, at a temperature reduced continuously or in stages from about 180° C to about 80° C and preferably from about 165° C to 90° C, with a timerelated temperature gradient which is governed by the reactivity of the particular system used and which may readily be empirically determined.

The present invention relates to a process for the production of high molecular weight NCO-group-free polyurethanes soluble in organic solvents by reacting dihydroxy compounds having an average molecular weight in the range of from about 500 to 5000, and optionally other compounds having two isocyanate-reactive groups and a molecular weight in the range of from about 32 to 400, and diisocyanates, with an equivalent ratio between NCO-groups and isocyanate-reactive groups of from about 0.92 to 1.0 (preferably from about 0.97 to 1.0), in the presence of an inert solvent, distinguished by the fact that:

a. the total quantity of diisocyanate is added to the dihydroxy compounds, optionally dissolved in from about 0 to 50% of the entire quantity of inert solvent used as reaction medium and optionally in admixture with the other isocyanate-reactive compounds at a temperature of from about 100° to 150° C, so that a starting temperature from about 20° to 60° C above the "specific reaction temperature" is reached under the effect of the heat of reaction liberated;

b. the reaction is allowed to continue at this starting temperature until the reaction mixture has reached a viscosity of from about 7000 to 20,000 cP, preferably from about 10,000 to 15,000 cP, and with particular preference a viscosity value of from about 60 to 110%, more especially from about 70 to 100%, of the particular end viscosity of the fully reacted mixture at the "specific reaction temperature";

c. the remaining 100 to 50% of the inert solvent, which has a temperature of from about 0° to 110° C, is added continuously or in stages over a period of from about 0.5 to 6 hours in such a way that the viscosity of the mixture remains substantially constant, the reaction mixture being simultaneously cooled;

d. the reaction mixture is optionally stirred at the "specific reaction temperature" until no further reaction takes place and until the maximum viscosity is reached; and finally e. when here is no further evidence of increasing viscosity, the reaction solution obtained, containing from about 30 to 70%, by weight, of polyurethane is cooled (preferably with a temperature gradient of from about 2° to 10° C/hour) to a temperature in the range of from about 80° to 100° C; and f. the polyurethane solid is recovered from the solution by removing the solvent in known manner.

BRIEF DESCRIPTION OF THE DRAWINGS

FIG. 4a is a plot of reaction temperature versus reaction time for a prior art process described in Example 1a.

DETAILED DESCRIPTION OF THE INVENTION

The advantageous results of the process according to the present invention are presumably attributable to a substantial utilization of the different extents to which competing isocyanate reactions are dependent upon temperature, as may be seen from the following considerations of the reaction kinetics involved.

In the ideal case, the polyurethane-forming reaction should take place as a reaction of the second order. Accordingly, plotting the expression $(C_o - C_t)/C_o \cdot C_t$ against the reaction time on a graph should produce a straight line with an ascent which is characteristic for the reaction temperature, $C_o$ being the initial concentration and $C_t$ being the actual concentration of the starting components at time $t$.

Figure 1:
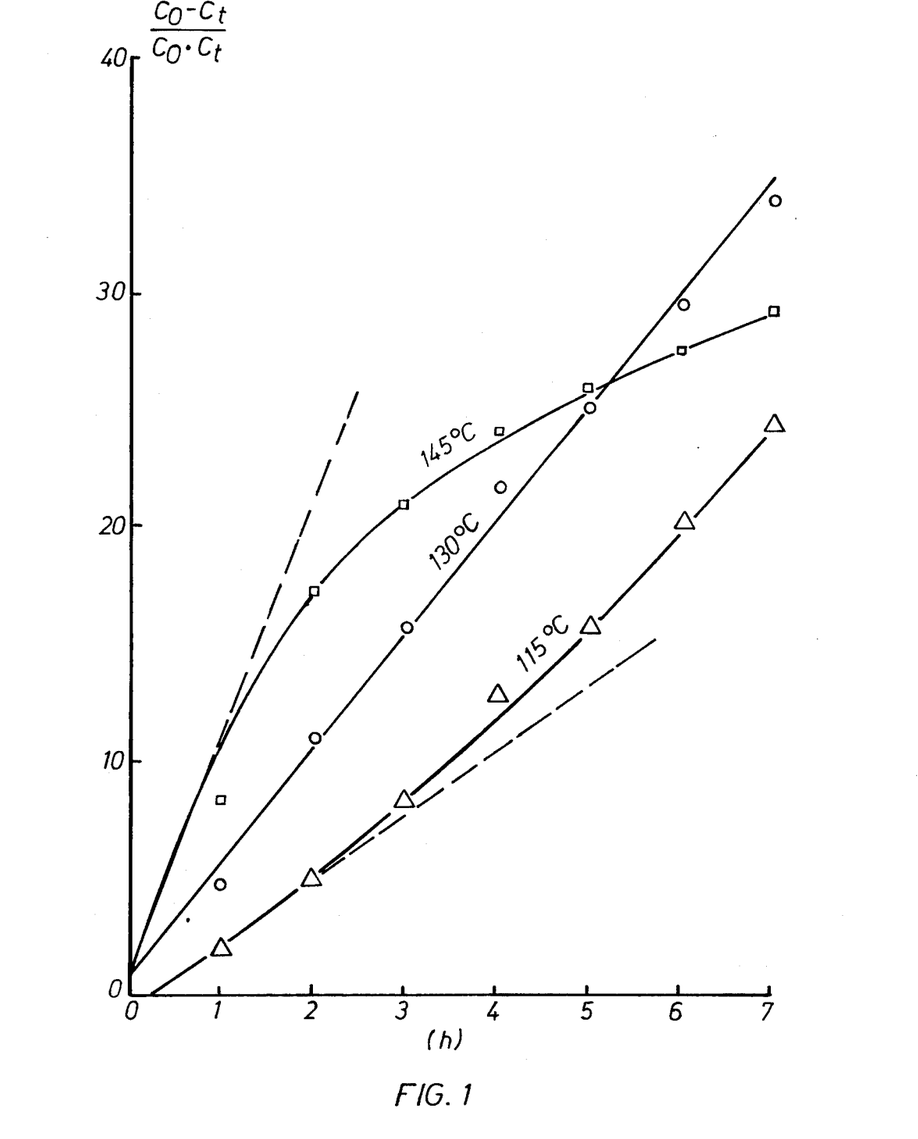
FIG. 1 is a series of plots of a concentration of isocyanate parameter versus time (in hours) for various reaction temperatures for the reaction of a hydroxy terminated polyester and toluene diisocyanate.

In FIG. 1, the expression $(C_o - C_t)/C_o \cdot C_t$ for the concentration of the isocyanate is plotted against the reaction time at different reaction temperatures for the reaction of an adipic acid -1,6-hexane diol polyester (hydroxyl number 135, acid number 0.8) with tolylene diisocyanate in 40% toluene solution at an NCO-OH ratio of 1.0.

It may be seen that a reaction temperature of 130° C comes closest to satisfying the requirement for a second order reaction. (as will immediately be seen, this temperature is identical with the "specific reaction temperature" defined above. The requirement that a certain reaction mixture should reach a maximum viscosity, i.e. should have as small a number of allophanate branchings as possible, is best satisfied under precisely those conditions where the polyaddition reaction takes place exactly as a reaction of the second order, i.e. when no troublesome secondary reactions occur). By contrast, clear deviation from the second order reaction (chain lines) occur after 2 hours at 115° C and after only 1 hour at 145° C due to increasing secondary reactions.

Figure 2:
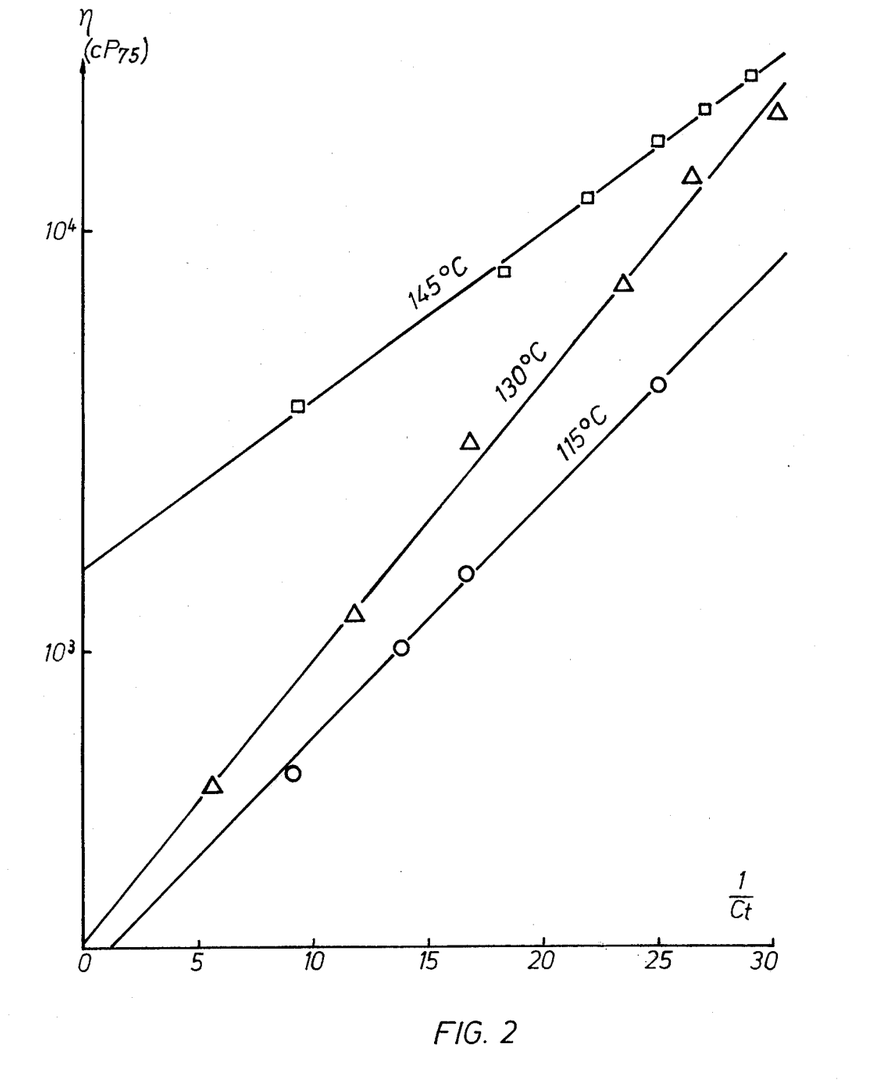
FIG. 2 is a series of plots of reaction mixture viscosity (in cP) versus percent conversion measured by the inverse of isocyanate content (in wt %) for various reaction temperatures for the same reaction system as FIG. 1.

Interesting indications of the high dependence upon temperature of the number of troublesome secondary reactions occurring during polyurethane formation may also be derived by considering the relationship between the viscosity of the reaction solution and the particular isocyanate concentration at constant temperature. FIG. 2 illustrates this dependence in the case of the above-mentioned reaction mixture. It may clearly be seen that, for a certain conversion (the quantity $1/C_t$ was selected as a measure of the conversion) (the starting components being present in the same quantitative ratio), the lowest solution viscosity, or in other words the greatest number of undesirable secondary reactions, is reached at a reaction temperature of 115° C. Although at a reaction temperature of 145° C the reaction follows a very favorable course in its initial phase, the flat rise of the straight lines is indicative of the increasing influence of secondary reactions. The high solution viscosity after substantially quantitative reaction of the isocyanate (high $1/C_t$ values) is ultimately obtained after intersection with the 145° C straight line at the "specific reaction temperature" of 130° C.

Figure 3:
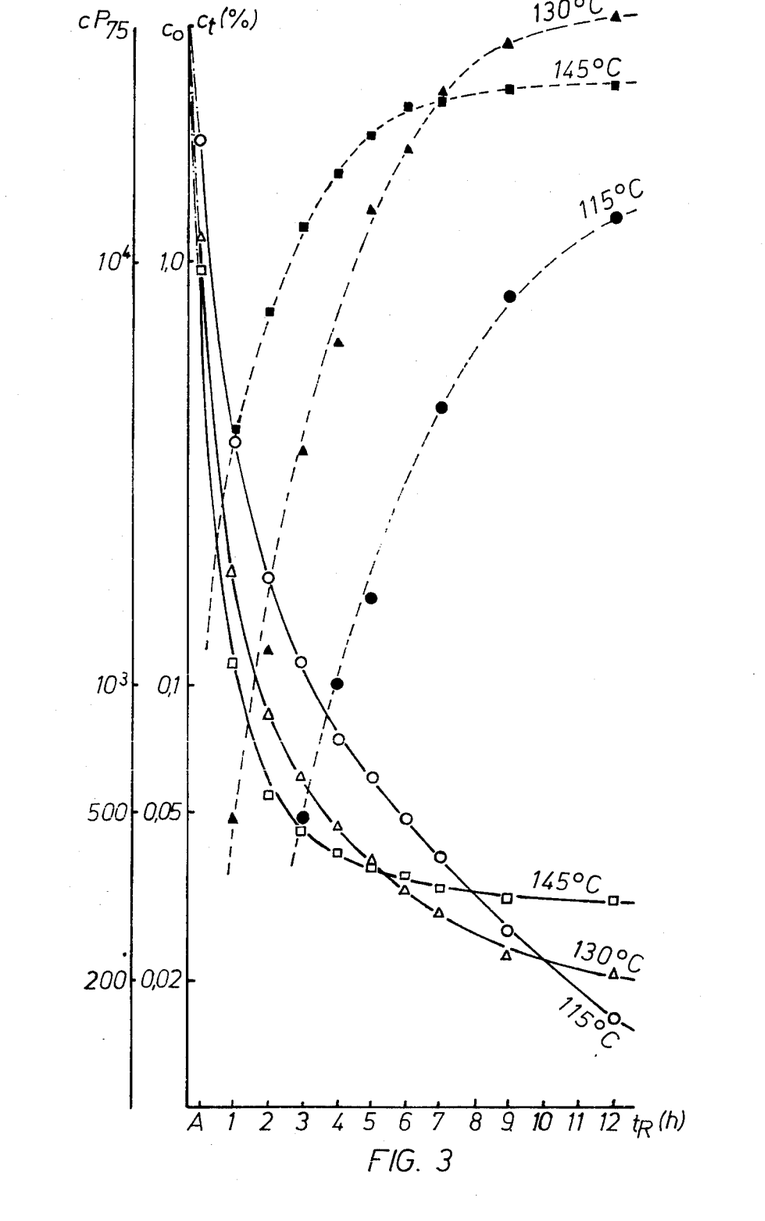
FIG. 3 is a series of plots of residual isocyanate content measured as percent of original isocyanate content (solid lines) and reaction mixture viscosity (broken lines) versus reaction time (in hours) for various reaction temperatures.

The solution viscosity values and residual NCO-content $C_t$ of the compared reaction mixtures which are recorded as a function of the reaction time in FIG. 3 also show very clearly that the more favorable results are initially obtained in the initial phase of the reaction at 145° C, although thereafter the 145° C curves soon incline towards a more unfavorable final value in the corresponding curves of the mixture reacting at 130° C.

According to the present invention, the temperature effects which have just been described may be used to obtain a surprising commercial and economic improvement in the process, according to which the polyurethane-forming reaction is started at from about 20° to 60° C, preferably at from about 25° to 35° C, above the "specific reaction temperature" defined above, the solution of the reaction mixture is cooled during the reaction to the "specific reaction temperature" with such a temperature/time gradient that, at any time, the reaction still meets as closely as possible the requirements of the second order (cf. FIG. 1), optionally followed by residence at the "specific reaction temperature" until the maximum viscosity has been reached and, finally, the solution is continuously cooled to an end temperature of from about 80° to 100° C until a solution substantially free from isocyanate is obtained.

It is extremely important in this process strictly to maintain the necessary temperature/time gradient with which the reaction solution is cooled from the starting temperature to the "specific reaction temperature". According to the present invention, the known difficulties of maintaining an exact temperature profile in stirrer-equipped vessels of large volume on account of the very slow-response temperature control systems normally used (cooled or heated outer coils), are readily obviated by using the solvent serving as reaction medium for controlling the temperature/time gradient.

This result is obtained (A) by adding the total quantity of diisocyanate and, optionally, chain extender to the polyol component, pre-heated to from about 100° to 150° C and preferably to the particular "specific reaction temperature" (which is generally from about 115° to 140° C and in most cases from about 120° to 135° C), in highly concentrated to solvent-free form (generally using from about 0 to 50%, by weight, and preferably from about 0 to 10%, by weight, of the total quantity of solvent) in a stainless steel stirrer-equipped vessel which is designed for an excess pressure of 6 bars and which is equipped with heatable and coolable outer coils, the required starting temperature (generally from about 160° to 180° C, preferably from 165° to 170° C) being reached in a few minutes (approximately 10 minutes) under the effect of the heat of reaction liberated, accompanied by an increase in viscosity, and (B), after a viscosity preferably corresponding substantially to the required end viscosity of the fully reacted solution at the "specific reaction temperature" (which viscosity may readily be determined from the power consumption of the stirrer) has been reached, adding the rest of the solvent either continuously or in stages in such a way that the reaction mixture remains in the required end viscosity range throughout the rest of the reaction, so that the reaction therefore takes place with advantage under substantially constant mass-transfer conditions. The temperature of the solvent added is in the range of from about 0° to 110° C and preferably in the range of from about 50° to 90° C, so that the cooling effect produced by the solvent during the dilution process corresponds to the required temperature/time gradient. By virtue of this artifice, the maximum viscosity corresponding to the thermodynamic equilibrium for the particular NCO:OH ratio and the "specific reaction temperature" may generally also be obtained at the same time following addition of the total quantity of solvent, so that the reaction mixture may be directly cooled to the final temperature of from about 80° to 100° C without any need for additional stirring thereafter at the "specific reaction temperature". This cooling, during which the remaining NCO-groups still present in a certain equilibrium concentration in view of the relatively high reaction temperatures react off (cf. FIG. 3), generally takes place with a temperature gradient, which is no longer relevant to the quality of the product, of from about 2° to 10° C per hour and preferably from about 3° to 6° C per hour, generally without any need for additional external tempering of the reaction mixture.

The polyurethane solid may be directly recovered in known manner, for example, by means of evaporation screws, from the resulting, substantially isocyanate-free solution which contains from about 30 to 70%, by weight, preferably from about 40 to 50%, by weight, of polyurethane and from about 70 to 30%, by weight, preferably from about 60 to 50%, by weight, of solvent.

It follows from the kinetic considerations in the preceding paragraphs that the following may be regarded as the optimum temperature profile during the polyaddition reaction:

To begin with, the starting components are left to react with one another at the starting temperature until that point at which the reaction begins to deviate from the second order is obtained (in FIG. 1 at 145° C this would be the case, for example, after about 1 hour because thereafter the conversion curve no longer shows a linear trend). Thereafter, the cool selvent is added at such time intervals that the maximum conversion, at which the requirement for a reaction of the second order is still just satisfied, is just obtained again at the particular temperature. In practice, this would mean that kinetic data according to FIG. 1 would have to be determined for a large number of temperatures between the starting temperature and the "specific reaction temperature". However, kinetic measurements of this type are too complicated in many cases (especially in cases where it is intended to use reaction mixtures with varying starting components). However, the procedure described above, in which simple viscosity control is all that is required, surprisingly represents an excellent approximation to the optimum reaction course which has just been outlined above, as shown by a number of practical tests. According to the present invention, therefore, it is sufficient to determine, by means of a few simple preliminary tests, the "specific reaction temperature" and the maximum equilibrium viscosity of the fully reacted polyurethane at that temperature which may be obtained by means of the process according to the present invention. The viscosity to be achieved at the starting temperature thus amounts to from about 60 to 110% and preferably to from about 70 to 100% of this viscosity value. During the process according to the present invention, the viscosity should be maintained to about ± 20% and preferably to about ± 15% (based in each case on the fluctuations in power consumption) by addition of the cooled solvent in stages or even continuously.

In practice, this generally means that the reaction mixture has a viscosity of from about 7000 to 20,000 cP, preferably from about 10,000 to 15,000 cP.

Without in any way impairing the rapid equilibrium adjustment characteristic of polyaddition in solution, the increase in the reaction velocity which may be obtained by the process according to the present invention not only produces a considerable improvement in the volume-time yield in relation to the prior art disclosed in DOS No. 2,149,836, it also surprisingly widens the scope of application of the process. Thus, it is possible, for example, effortlessly to react even less reactive polyol components in solution with diisocyanates to form high molecular weight polyurethanes whose polyaddition in accordance with DOS No. 2,149,836 involves difficulties (cf. Examples 4a/b).

In addition, it is also possible where necessary, by virtue of the increased reactivity attributable to the higher reaction temperatures by comparison with DOS No. 2,149,836, to use more strongly polar solvents with $E_T$-values of greater than 35 (for the definition of the $E_T$-value as a measure of solvent polarity, cf. Fortschr. chem. Forsch. vol 11/1, pages 1–73), so that it is even possible readily to produce in homogeneous solution polyurethanes of the type which show excessively high intrinsic viscosity or thixotropic effects in the weakly polar solvents proposed in DOS No. 2,149,836 with $E_T$-values of less than 35 (cf. Examples 3 a/b). According to the present invention, it is preferred to use mixtures of a weakly polar solvent and a polar solvent as solvents with relatively high polarity. Particularly preferred mixtures are mixtures of from about 70 to 100%, by weight, of toluene, as the weakly polar component, and from about 30 to 0%, by weight, of cyclohexanone, as the polar component. In principle, however, it is also possible to use any other anhydrous and inert solvents (mixtures) with comparable polarity. Solvents which may be used either individually or in admixture in accordance with the present invention are, for example, toluene, xylene, cyclohexane, benzene, diisopropyl ether, di-n-butyl ether, carbon disulphide, hexane(ligroin), cyclohexanone, acetone, methyl ethyl ketone, dioxane, tetrahydrofuran, dimethyl formamide, dimethyl acetamide and tetramethyl urea.

However, the highly polar solvents which have just been mentioned are less preferred for ecological reasons.

Starting components suitable for use in accordance with the invention are e.g. aliphatic, cycloaliphatic, araliphatic and aromatic diisocyanates of the type described, for example, by W. Siefken in Justus Liebigs Annalen der Chemie, 562, pages 75 to 136, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3 and 1,4-diisocyanate and mixtures of these isomers, 1-isocyanato-3,3,5-trimethyl-5-isocyanato methyl cyclohexane (DAS No. 1,202,785, U.S. Pat. No. 3,401,190), 2,4- and 2,6-hexahydrotolylene diisocyanate and mixtures of these isomers, hexahydro-1,3 and/or 1,4-phenylene diisocyanate, perhydro-2,4'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4' and/or -4,4'-diisocyanate, naphthylene-1,5-diisocyanate, m- and p-isocyanatophenyl sulphonyl isocyanates according to U.S. Pat. No. 3,454,606, diisocyanates containing carbodiimide groups of the type described in German Pat. No. 1,092,007 (U.S. Pat. No. 3,152,162), diisocyanates of the type described in U.S. Pat. No. 3,492,330, diisocyanates containing urethane groups of the type described, for example, in Belgian Pat. No. 752,261 or in U.S. Pat. No. 3,394,164, or diisocyanates containing acylated urea groups according to German Pat. No. 1,230,778 and para-xyxylene diisocyanate.

It is also possible to use mixtures of these diisocyanates.

Diisocyanates preferably used in accordance with the present invention are 2,4- and/or 2,6-tolylene diisocyanate, 4,4'-diphenyl methane diisocyanate, hexamethylene diisocyanate and 1-isocyanato-3,3,5-trimethyl-5-isocyanato methyl cyclohexane.

Other starting components suitable for use in accordance with the invention are compounds having two hydroxyl groups and molecular weights in the range of from about 500 to 5000, preferably from about 650 to 2600, for example, polyesters, polyethers, polythioethers, polyacetals, polycarbonates and polyester amides containing two hydroxyl groups, of the type commonly used for the production of homogeneous and cellular polyurethanes.

The polyesters containing hydroxyl groups suitable for use in accordance with the present invention are reaction products of dihydric alcohols with dibasic carboxylic acids. Instead of using the free polybasic-carboxylic acids, it is also possible to use the corresponding polybasiccarboxylic acid anhydrides or esters of lower alcohols or mixt ures thereof for production of the polyesters. The polybasic carboxylic acids may be aliphatic, cycloaliphatic, aromatic and/or heterocyclic and may optionally be substituted, for example, by halogen atoms, and/or be unsaturated. Examples of polycarboxylic acids of this type include: succinic acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric fatty acids, such as oleic acid, optionally in admixture with monomeric fatty acids, terephthalic acid dimethyl ester and terephthalic acid-bis-glycol ester. Examples of suitable dihydric alcohols include: ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxy methyl cyclohexane), 2-methyl-1,3-propane diol, also diethylene glycol, triethylene glycol, tetraethylene glycol, polyethylene glycols, dipropylene glycol, polypropylene glycols, dibutylene glycol and polybutylene glycols. Polyesters of lactones, for example, ε-caprolactone, or hydroxy carboxylic acids, for example, ω-hydroxy caproic acid, may also be used.

The polyethers containing two hydroxyl groups suitable for use in accordance with the present invention are also known and may be obtained, for example, by the polymerization of epoxides, such as ethylene oxide, propylene oxide, butylene oxide, tetrahydrofuran, styrene oxide or epichlorohydrin, on their own for example in the presence of $BF_3$, or by the addition of these epoxides, optionally in admixture or successively, with starting components containing reactive hydrogen atoms, such as alcohols or amines, for example, water, ethylene glycol, 1,3- or 1,2-propylene glycol, 4,4'-dihydroxy diphenyl propane, aniline, ethanolamine or ethylene diamine. In many cases, it is preferred to use polyethers of the type which predominantly contain primary OH-groups (up to 90%, by weight, based on all the OH-groups present in the polyether).

Among the polythioethers, particular reference is made to the condensation products of thiodiglycol on its own and/or with other glycols, dicarboxylic acids, formaldehyde, amino carboxylic acids or amino alcohols. Depending upon the co-components, the products are polythio mixed ethers, polythio ether esters or polythio ether ester amides.

Examples of polyacetals are the compounds obtainable from glycols, such as diethylene glycol, triethylene glycol, 4,4'-dioxethoxy diphenyl dimethyl methane and hexane diol, with formaldehyde. Polyacetals suitable for use in accordance with the present invention may also be obtained by the polymerization of cyclic acetals.

Suitable polycarbonates containing hydroxyl groups are those known compounds which may be obtained, for example, by reacting diols, such as 1,3-propane diol, 1,4-butane diol and/or 1,6-hexane diol, diethylene glycol, triethylene glycol or tetraethylene glycol, with diaryl carbonates, for example, diphenyl carbonate, or phosgene.

The polyester amides and polyamines include, for example, the linear condensates obtained from dibasic saturated and unsaturated carboxylic acids or their anhydrides (e.g. those mentioned above) and dihydric saturated and unsaturated amino alcohols, diamines and mixtures thereof (e.g. those which are listed below as chain extending agents).

Representatives of these compounds suitable for use in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5 to 6 and 198 to 199, and also in Kunststoff-Handbuch, Vol. VII, Vieweg-Hochtlen, Carl-Hanser-Verlag, Munich, 1966, for example, on pages 45 to 71.

It is, of course, also possible to use mixtures of the above-mentioned compounds, for example, mixtures of polyethers and polyesters.

Starting components which may optionally be used in accordance with the present invention are also compounds having two isocyanate-reactive hydrogen atoms and a molecular weight in the range of from about 32 to 400. In this case, too, these compounds are compounds containing hydroxyl groups and/or amino groups and-/or thio groups and/or carboxyl groups, preferably compounds which contain hydroxyl groups and/or amino groups and which are used as chain extenders or crosslinkers.

According to the present invention, it is possible to use a variety of different low molecular weight diol compounds, for example:

a. alkane diols, such as ethylene glycol, 1,3-propylene glycol and 1,2-propylene glycol, 1,4-butane diol, 1,5-pentane diol, dimethyl-1,3-propane diol and 1,6-hexane diol;

b. ether diols, such as diethylene glycol, triethylene glycol or 1,4-phenylene-bis-(β-hydroxy ethyl ether);

c. amino diols, such as N-methyl diethanolamine or N-methyl dipropanol amine;

d. ester diols corresponding to the following general formula:

and wherein
R represents an alkylene or arylene radical having from 1 to 10, preferably from 2 to 6, carbon atoms,
x = 2 to 6 and
y = 3 to 5; for example, δ-hydroxybutyl-ε-hydroxy caproic acid ester, ω-hydroxy hexyl-γ-hydroxy butyric acid ester, adipic acid- (β-hydroxy ethyl)ester and terephthalic acid-bis-(β-hydroxy ethyl)ester;

e. diol urethanes corresponding to the following general formula:

wherein
R' represents an alkylene, cycloalkylene or arylene radical having from 2 to 15, preferably from 2 to 6, carbon atoms, and
x is a number of from 2 to 6; for example, 1,6-hexamethylene-bis-(β-hydroxyethylurethane) or 4,4'-diphenyl methane-bis-(δ-hydroxybutyl urethane);

f. diol ureas corresponding to the following general formula:

wherein
R" represents an alkylene, cycloalkylene or arylene radical having from 2 to 15, preferably from 2 to 9, carbon atoms,
R''' represents H or CH₃ and
x = 2 or 3; for example, 4,4'-diphenyl methane-bis-(β-hydroxyethylurea) or the compound:

Examples of aliphatic diamines which may be used individually or in admixture as chain extenders in accordance with the present invention include: ethylene diamine, 1,2-propylene diamine and 1,3-propylene diamine, 1,4-tetramethylene diamine, 1,6-hexamethylene diamine, N,N'-diisobutyl-1,6-hexamethylene diamine, 1,11-undecamethylene diamine, 1,12-dodecamethylene diamine, cyclobutane-1,3-diamine, cyclohexane-1,3- and 1,4-diamine and mixtures thereof, 1-amino-3,5,5-trimethyl-5-aminomethyl cyclohexane, 2,4- and 2,6-hexahydrotolylene diamine and mixtures thereof, perhydro-2,4'- and -4,4'-diaminodiphenyl methane, p-xylylene diamine, bis-(3-aminopropyl)-methyl amine, etc. It is also possible in accordance with the present invention to use hydrazine and substituted hydrazines, for example, methyl hydrazine, N,N'-dimethyl hydrazine and their homologues, also acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semicarbazido alkylenehydrazides, such as β-semicarbazido propionic acid hydrazide (DOS No. 1,770,591), semicarbazido-alkylene-carbazinic esters, such as 2-semicarbazido-ethyl-carbazinic ester (DOS No. 1,918,504) or even aminosemicarbazide compounds, such as β-aminoethyl-semicarbazido-carbonate (DOS No. 1,902,931).

In order to obtain soluble products, it is important to bear in mind that, where the above-mentioned diamines, hydrazines and hydrazides are used, they are combined with aliphatic or cycloaliphatic diisocyanates or with isocyanate mixtures predominantly consisting (more than 50 mol % and preferably more than 70 mol %) of (cyclo) aliphatic diisocyanates. So-called "soft-solvent" systems of this type are described, for example, in DOS No. 2,221,750; 2,221,751 (U.S. Pat. No. 3,867,350); 2,221,798 (U.S. Pat. No. 3,857,809) and in U.S. Pat. Nos. 3,609,112; 3,734,894 and 3,752,786.

In cases where the starting components include compounds which react differently with respect to isocyanates (for example, primary and secondary diols or diols and diamines), it is generally best not to mix these components with the diisocyanate in a single stage, but in a sequence opposite to their reactivity (i.e. first secondary diols and then primary diols and then diamines). The same applies in cases where it is intended to use mixtures of differently reactive diisocyanates. However, it is preferred to mix all the starting components with one another within the period in which the reaction mixture is at the starting temperature (i.e. before the required viscosity value is reached).

The viscosity measurements required for controlling the process according to the present invention are made easier by the fact that semi-logarithmic plotting of the dependence upon temperature of viscosity (log η against T° C) produces straight lines which run parallel to one another for different polyurethanes and different molecular weights. In other words, it is sufficient for a certain solvent system to record one straight calibration line log η/T° C with one polyurethane. Viscosity values of other polyurethanes at elevated temperatures may then readily be extrapolated from measured data determined in conveniently accessible temperature ranges (approximately 75° C).

The process according to the present invention is illustrated by, but by no means limited to, the following Examples. Unless otherwise stated, the figures quoted represent %, by weight, or parts, by weight.

EXAMPLE 1a (Prior Art)

Figure 4A:
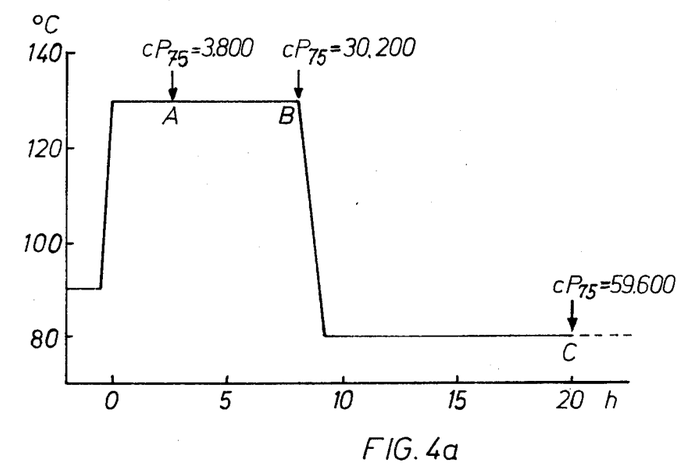

In a stirrer-equipped vessel designed for an excess pressure of 6 bars, 104.3 parts, by weight, of tolylene diisocyanate are added at 90° C to a solution of 500 parts, by weight, of a polyester of adipic acid and 1,6-hexane diol having a hydroxyl number of 134.8 and an acid number of 0.7 in 905 parts, by weight, of toluene, corresponding to an NCO:OH ratio of 0.992. The mixture is heated with intensive stirring over a period of 15 minutes to the "specific reaction temperature" of 130° C and is stirred at that temperature. In FIG. 4, the temperature of the reaction mixture is plotted against time. A sample of the rection solution taken after 2.5 hours has a viscosity of 3800 centipoises at 75° C (point "A" in FIG. 4a). After a total reaction time of 8 hours at 130° C, the 40% solution reaches its maximum viscosity of 30,200 centipoises at 75° C and a residual content of 0.026% of free isocyanate (point "B" in FIG. 4a). After the solution has been tempered for 12 hours at 80° C, no more free isocyanate may be detected. The viscosity now amounts to 59,600 centipoises at 75° C (point "C" in FIG. 4a). The total reaction time thus amounts to 20 hours.

Removal of the solvent in an evaporation screw leaves a polyurethane solid of which a 30% solution in ethyl acetate has a viscosity of 38,100 centipoises at 20° C.

Example 1b (Process according to the present invention)

Figure 4B:
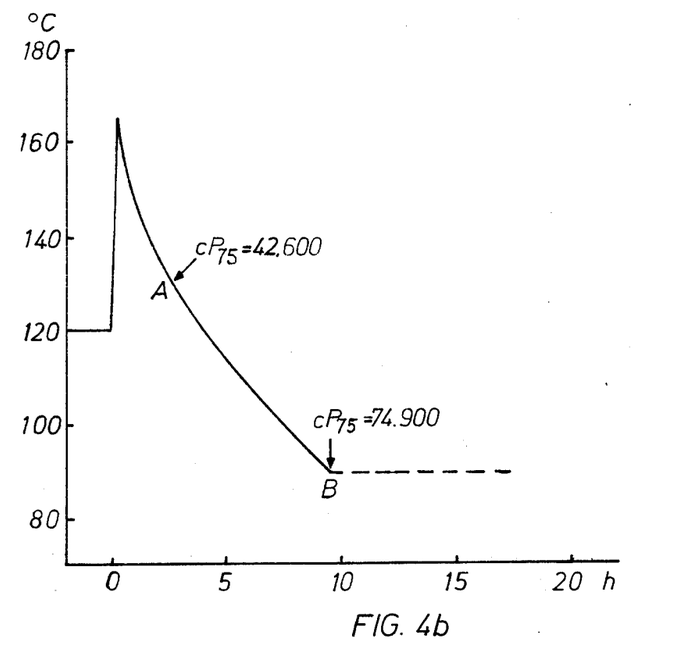
FIG. 4b is a plot of reaction temperature versus reaction time for the process of the present invention described in Example 1b.

In a vessel equipped with a helical stirrer and designed for an excess pressure of 6 bars, 104.3 parts, by weight, of tolylene diisocyanate are added, over a period of 10 minutes with the stirrer rotating at 45 r.p.m., to 500 parts, by weight, of a polyester, pre-heated to 120° C, of adipic acid and 1,6-hexane diol having a hydroxyl number of 134.8 and an acid number of 0.7, corresponding to an NCO:OH ratio of 0.992. The temperature rises to 165° C. After the power consumption of the stirrer has risen to about 40A due to increasing viscosity, 905 parts, by weight, of toluene pre-heated to 90° C are added in portions in such a way that the power consumption of the stirrer is constant at from 30 to 40A (which corresponds to a viscosity of from about 8,000 to 12,000 cP). In accordance with a relation between viscosity, stirrer speed, filling level of the vessel and power consumption empirically determined for the stirrer-equipped vessel, the rotational speed of the stirrer is regulated back with increasing filling level until, finally, it amounts to 20 r.p.m. in such a way that the power consumption remains constant at substantially the same viscosity. The temperature pattern is illustrated in FIG. 4b in the same way as in FIG. 4a. The addition of toluene is over after 2.5 hours, by which time the temperature of the reaction mixture is 130° C. A sample of the 40% reaction solution has a viscosity of 42,600 centipoises at 75° C and a residual free isocyanate content of 0.029% (point "A" in FIG. 4b).

The mixture is allowed to cool to 90° C over a period of 7 hours with the stirrer turning at 15 r.p.m. Thereafter hardly any more free isocyanate may be detected. The solution now has a viscosity of 74,900 centipoises at 75° C after a total reaction time of only 9.5 hours (point "B" in FIG. 4b), as against 20 hours in Example 1a. Removal of the solvent in an evaporation screw leaves a polyurethane solid of which a 30% solution in ethyl acetate has a viscosity of 56,000 centipoises at 20° C.

EXAMPLE 2a (Prior Art)

In accordance with Example 1a, a mixture of 500 parts, by weight, of a polyester of adipic acid and 1,4-butane diol (hydroxyl number 52.5; acid number 0.6) with 41.2 parts, by weight, of tolylene diisocyanate, corresponding to an NCO:OH ratio of 1.0, in 815 parts, by weight, of toluene is heated with continuous stirring to the "specific reaction temperature" of 115° C. After 3 hours, the reaction solution has a viscosity of 4820 cP (as measured at 75° C) and reaches its maximum viscosity of 20,000 cP (as measured at 75° C) for a free residual isocyanate content of 0.045% after a reaction time of 17 hours at 115° C. After tempering for 24 hours at 80° C, the reaction mixture is substantially free from isocyanate and has a viscosity of 170,000 cP (as measured at 75° C).

Accordingly, the total reaction time amounts to 41 hours. The polyurethane solid obtained following removal of the toluene has a viscosity of 1250 cP at 20° C in the form of a 15% solution in methyl ethyl ketone.

Example 2b (Process according to the present invention)

In accordance with Example 1b, 41.2 parts, by weight, of tolylene diisocyanate are added with the stirrer rotating at 45 r.p.m. to 500 parts, by weight, of a polyester, pre-heated to 130° C, of adipic acid and 1,4-butane diol (hydroxyl number 52.5; acid number 0.6), corresponding to an NCO:OH ratio of 1.0. The reaction mixture is brought over a period of 10 minutes to a starting temperature of 165° C under the effect of the heat of reaction liberated. When the power consumption reaches 45A due to increasing viscosity, 815 parts, by weight, of toluene pre-heated to 85° C are added over a period of 3 hours in such a way that the temperature of the reaction mixture amounts to 140° C after 1 hour and to 125° C after 3 hours. The power consumption of the stirrer remains constant at from 35 to 45 A (corresponding to a viscosity of from 10,000 to 15,000 cP), the rotational speed of the stirrer again being regulated back to 20 r.p.m. in dependence upon the filling level of the vessel.

A sample of the reaction mixture containing the entire quantity of solvent has a viscosity of 65,000 cP at 75° C and a residual free isocyanate content of 0.023% after a reaction time of three hours.

The reaction mixture is left to cool from 125° C to 90° C over a period of 7 hours. Thereafter, hardly any more free isocyanate may be detected. The solution now has a viscosity of 220,000 cP at 75° C after a total reaction time of only 10 hours as against 41 hours in comparison Example 2a.

Removal of the toluene leaves a polyurethane solid of which a 15% solution in methyl ethyl ketone has a viscosity of 1530 cP at 20° C.

EXAMPLE 3a (Prior Art)

500 parts, by weight, of a polyester of adipic acid and 1,4-butane diol (hydroxyl number 32.5; acid number 0.6) and 8.0 parts, by weight, of 1,4-butane diol are dissolved in 882 parts, by weight, of toluene, followed by the addition with intensive stirring over a period of 20 minutes at the "specific reaction temperature" of 120° C of 81.8 parts, by weight, of molten diphenyl methane-4,4'1-diisocyanate, corresponding to an NCO:OH ratio of 0.996. The reaction is continued with stirring at 120° C until the maximum viscosity has been reached. The power consumption of the stirring may no longer be used for monitoring viscosity on account of the increasing intrinsic viscosity. In order, therefore, to monitor viscosity, samples are taken at time intervals and diluted with methyl ethyl ketone to a solids content of 15%.

These diluted samples show a viscosity of 130 cP (20° after a reaction time of 2 hours and a maximum viscosity of 340 cP at 20° C after a reaction time of 12 hours for a residual free isocyanate content of 0.022% in the reaction mixture.

The reaction mixture is then aftertreated for 18 hours at 80° C until substantially free from isocyanate, resulting in a total reaction time of 30 hours. A sample of the substantially isocyanate-free reaction mixture has a viscosity of 1870 cP at 20° C after dilution with methyl ethyl ketone to a solids content of 15%.

In order to recover the polyurethane solid by means of an evaporation screw, the gelatinous reaction mixture is first diluted with 132 parts, by weight, of methyl ethyl ketone (corresponding to about 15% of the quantity of toluene used) in order to reduce the intrinsic viscosity and to obtain a pumpable and transportable solution.

The solid obtained dissolves in methyl ethyl ketone with a viscosity of 1250 cP at 20° C and a solids content of 15%. The methyl ethyl ketone added has to be separated off by distillation from the solvent recovered before it may be re-used.

Example 3b (Process according to the present invention)

In accordance with Examples 1b and 2b, 81.8 parts, by weight, of molten diphenyl methane-4,4'-diisocyanate are added, with stirring (45 r.p.m.) at 120° C, to 500 parts, by weight, of a polyester of adipic acid and 1,4-butane diol (hydroxyl number 52.2; acid number 0.6) and 8.0 parts, by weight, of 1,4-butane diol in a solvent mixture of 79.38 parts, by weight, of toluene and 0.82 parts, by weight, of cyclohexane, corresponding to an NCO:OH ratio of 0.996. The temperature rises to 170° C and the power consumption of the stirrer to 45 A over a period of 10 minutes. A mixture, pre-heated to 75° C, of 714.42 parts, by weight, of toluene and 79.38 parts, by weight, of cyclohexanone is then added over a period of 2 hours in the manner described in Examples 1b and 2b in such a way that the temperature of the reaction mixture amounts to 145° C after a reaction time of 1 hour and to 135° C after a reaction time of 2 hours by which time all the solvent has been added. During this time, the viscosity amounts to from 12,000 to 20,000 cP (power consumption from 40 to 50 A) the resulting 40% reaction solution shows normal flow properties and has a viscosity of 81,300 cP at 75° C and an isocyanate content of 0.024%.

The solution is left to cool 90° over a period of 7 hours, after which hardly any more free isocyanate may be detected. The viscosity at 75° C now amounts to 212,000 cP after a total reaction time of 9 hours (as against 30 hours in comparison Example 3a). The polyurethane solid obtained following removal of the solvent dissolves in methyl ethyl ketone with a viscosity of 1360 cP at 20° C and a solids content of 15%.

The solvent mixture recovered may be directly returned to the reaction circuit. If necessary the solvent mixture may be dried before it is re-used in exactly the same way as in the procedure using pure toluene by straight-forward distillation preferably carried out continuously in an azeotropic column.

Example 4a (Prior Art)

250 parts, by weight, of hexane diol polycarbonate (hydroxyl number 112.5; acid number 0.1), 250 parts, by weight, of polypropylene glycol ether (hydroxyl number 111.5; acid number 0.01) and 9 parts, by weight, of 1,4-butane diol are dissolved in 920 parts, by weight, of toluene, followed by the addition with intensive stirring over a period of 15 minutes at 130° C of 10.43 parts, by weight, of tolylene diisocyanate, corresponding to an NCO:OH ratio of 0.999. The mixture is stirred at 130° C ("specific reaction temperature") until the maximum viscosity is reached. A sample taken after 3 hours has a viscosity of 2600 cP at 75° C. The maximum viscisoty is reached after 10 hours and amounts to 19,700 cP at 175° C for an isocyanate content of 0.03%. After the reaction mixture has been additionally stirred for 15 hours at 80° C, no more free isocyanate may be detected. After a total reaction time of 25 hours, the viscosity amounts to 31,400 cP at 75° C.

Removal of the solvent leaves a polyurethane solid of which a 30% solution in ethyl acetate has a viscosity of 20,900 cP at 20° C which is too low for normal textile-coating requirements.

Example 4b (Process according to the present invention)

In accordance with Examples 1b and 2b, 104.3 parts, by weight, of tolylene diisocyanate are added, with stirring at 140° C, to 250 parts, by weight, of hexane diol polycarbonate (hydroxyl number 112.5; acid number 0.1) and 250 parts, by weight, of polypropylene glycol ether (hydroxyl number 111.5; acid number 0.01). Using the heat of reaction, the reaction mixture is heated over a period of 10 minutes to 165° C, the stirrer reaching a power consumption of about 35 A at 45 r.p.m. 9 parts, by weight, of 1,4-butane diol are then quickly added, the power consumption increasing to 45 A. The successive addition of 920 parts, by weight, of toluene pre-heated to 95° C is then immediately commenced. The toluene is added in such a way that, for a substantially uniform viscosity of the reaction mixture (from 8000 to 12,000 cP, corresponding to a power consumption of from 30 to 40 A), the reaction temperature has fallen to 145° C after 1 hour and amount to 130° C 3 hours after all the toluene has been added. The reaction mixture now has a viscosity of 40,200 cP (as measured at 75° C) and an isocyanate content of 0.026%. After the reaction mixture has been cooled to 90° C over a period of 8 hours, hardly any more free isocyanate may be detected. After a total reaction time of 11 hours, the viscosity amounts to 67,100 cP (as measured at 75° C).

Removal of the solvent leaves a polyurethane solid of which a 30% solution in ethyl acetate has a viscosity of 49,800 cP at 20° C, corresponding to the normal specification range for coating textiles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of high molecular weight polyurethanes which are free from NCO-groups and soluble in organic solvents comprising reacting a dihydroxy compound having an average molecular weight of from about 500 to 5000, and optionally another compound having two isocyanate-reactive groups and a molecular weight in the range of from about 32 to 400, and an organic diisocyanate, the equivalent ratio between NCO-groups to isocyanate-reactive groups being from about 0.92 to 1.0, in the presence of an inert solvent, wherein a. the total quantity of diisocyanate is added at a temperature of from about 100° to 150° C to the dihydroxy compond dissolved in from about 0 to 50% of the total quantity of inert solvent used as reaction medium and optionally in admixture with the other isocyanate-reactive compound, so that a starting temperature of from about 20° to 60° C above the specific reaction temperature in the range of about 100° – 160° C is achieved from the heat of reaction;

b. the reaction is carried out at this starting temperature until the reaction mixture reaches a viscosity of from about 7000 to 20,000 cP; after which c. the remaining about 100 to 50% of the quantity of inert solvent at a temperature of from about 0° to 110° C is added either in stages or continuously over a period of from about 0.5 to 6 hours in such a way that the viscosity of the reaction mixture remains substantially constant, the reaction mixture being cooled at the same time;

d. the reaction mixture is optionally stirred at the specific reaction temperature in the range of about 100° – 160° C until no further reaction takes place and the maximum viscosity has been reached; and finally e. when there is no sign of any further increase in viscosity, the resulting reaction solution containing from about 30 to 70%, by weight, of polyurethane is cooled to a temperature of from about 80° to 100° C. and f. the polyurethane solid is recovered from the solution in known manner by removing the solvent.

2. A process as claimed in claim 1, wherein the reaction is carried out at a starting temperature from about 25° to 35° C above the specific reaction temperature in the range of about 100° – 160° C until the reaction mixture has reached a viscosity of from about 10,000 to 15,000 cP.

3. A process as claimed in claim 1, wherein the reaction is carried out at the starting temperature until a viscosity amounting to from about 70 to 100% of the final viscosity at the specific reaction temperature in the range of about 100° – 160° C has been reached.

4. A process as claimed in claim 1 wherein the viscosity of the reaction mixture is kept constant to ± 20% during the cooling period (c).

5. A process as claimed in claim 1 wherein a mixture of from about 70 to 100%, by weight, of a weakly polar solvent with an $E_T$-value of less than about 35 and from about 30 to 0%, by weight, of a polar solvent with an $E_T$-value of greater than about 35 is used as the inert solvent.

6. A process as claimed in claim 5, wherein a mixture of from about 70 to 100%, by weight, of toluene and from about 30 to 0%, by weight, of cyclohexanone is used as the inert solvent.

7. The process of claim 1 wherein the reaction is carried out at the starting temperature until the reaction mixture reaches a viscosity substantially equal to the required end viscosity of the fully reacted solution.

8. The process of claim 1 wherein the reaction solution in step (e) is cooled with a temperature gradient of from 2 to 10° C/hour.

9. The process of claim 1, wherein said specific reaction temperature is in the range of about 115° – 140° C.

* * * * *